(12) United States Patent
Prasad et al.

(10) Patent No.: US 7,861,823 B2
(45) Date of Patent: Jan. 4, 2011

(54) DUCT FOR REDUCING SHOCK RELATED NOISE

(75) Inventors: Dilip Prasad, Vernon, CT (US); Anil Prasad, Vernon, CT (US); John Michael Feiereisen, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 776 days.

(21) Appl. No.: 11/267,241

(22) Filed: Nov. 4, 2005

(65) Prior Publication Data

US 2007/0102234 A1     May 10, 2007

(51) Int. Cl.
*B64D 33/02*     (2006.01)

(52) U.S. Cl. ................. 181/214; 181/210; 181/221; 181/222

(58) Field of Classification Search ............... 181/214, 181/210, 221, 222, 261; 415/119, 208.1, 415/208.2, 208.3, 208.4, 208.5, 211.1, 211.2
See application file for complete search history.

(56) References Cited

U.S. PATENT DOCUMENTS

| | | | |
|---|---|---|---|
| 3,184,152 A * | 5/1965 | Bourquard | 415/181 |
| 3,508,838 A | 4/1970 | Martenson | |
| 3,574,477 A * | 4/1971 | Dolf et al. | 415/60 |
| 3,761,196 A * | 9/1973 | Weinert | 415/119 |
| 3,873,229 A * | 3/1975 | Mikolajczak et al. | 415/119 |
| 3,883,268 A * | 5/1975 | Evans et al. | 416/223 R |
| 3,989,406 A | 11/1976 | Bliss | |
| 4,086,022 A * | 4/1978 | Freeman et al. | 415/119 |
| 4,104,002 A * | 8/1978 | Ehrich | 415/119 |
| 4,122,672 A | 10/1978 | Lowrie | |
| 4,531,362 A | 7/1985 | Barry et al. | |
| 4,606,699 A | 8/1986 | Hemsworth | |
| 4,645,417 A | 2/1987 | Wisler | |
| 4,714,406 A | 12/1987 | Hough | |
| 4,998,039 A * | 3/1991 | Thayer et al. | 313/231.41 |
| 5,137,419 A | 8/1992 | Waterman | |
| 5,175,401 A | 12/1992 | Arcas et al. | |
| 5,290,144 A | 3/1994 | Kreitmeier | |
| 5,520,508 A * | 5/1996 | Khalid | 415/119 |

(Continued)

FOREIGN PATENT DOCUMENTS

DE      2036487      2/1972

(Continued)

OTHER PUBLICATIONS

U.S. Appl. No. 11/112,946, filed Apr. 22, 2005.

(Continued)

*Primary Examiner*—Elvin G Enad
*Assistant Examiner*—Forrest M Phillips
(74) *Attorney, Agent, or Firm*—Carlson, Gaskey & Olds PC

(57) ABSTRACT

A duct 26 has circumferentially distributed features capable of scattering acoustic energy associated with fluid dynamic shocks 34 extending in a shock orientation direction D. Each feature is oriented, over at least a portion of its length, substantially perpendicular to the shock orientation direction. The features may be splices 42 used to connect segments of an acoustic liner 30, partitions 56 in a stability enhancing casing treatment 32, or other features capable of scattering acoustic energy associated with shocks.

26 Claims, 4 Drawing Sheets

U.S. PATENT DOCUMENTS

| | | |
|---|---|---|
| 5,581,054 A | 12/1996 | Anderson et al. |
| 5,616,000 A * | 4/1997 | Yamada et al. ............... 415/191 |
| 5,762,470 A | 6/1998 | Gelmedov et al. |
| 6,139,259 A * | 10/2000 | Ho et al. ...................... 415/119 |
| 6,293,754 B1 * | 9/2001 | Liang et al. ..................... 416/1 |
| 6,379,110 B1 * | 4/2002 | McCormick et al. ......... 415/119 |
| 6,409,469 B1 * | 6/2002 | Tse ............................ 415/119 |
| 6,764,276 B2 * | 7/2004 | Mulcaire et al. ............. 415/119 |
| 6,877,953 B2 | 4/2005 | Guemmer |
| 7,104,749 B2 * | 9/2006 | Frutschi ......................... 415/1 |
| 7,104,750 B2 * | 9/2006 | Bolis et al. .................. 415/116 |
| 7,104,752 B2 * | 9/2006 | Matheny et al. ............. 415/119 |
| 2004/0094359 A1 | 5/2004 | Porte et al. |
| 2006/0011408 A1 * | 1/2006 | Kempton et al. ............ 181/214 |
| 2006/0029493 A1 * | 2/2006 | Schwaller et al. ............ 415/119 |
| 2007/0102234 A1 * | 5/2007 | Prasad et al. ................. 181/214 |
| 2007/0160459 A1 * | 7/2007 | Tudor .......................... 415/119 |
| 2007/0267246 A1 * | 11/2007 | Ali et al. ...................... 181/214 |

FOREIGN PATENT DOCUMENTS

| | | |
|---|---|---|
| EP | 0572725 | 12/1993 |
| JP | 51052801 | 5/1976 |
| JP | 7-12098 | 6/1993 |

OTHER PUBLICATIONS

U.S. Appl. No. 11/112,642, filed Apr. 22, 2005.
U.S. Appl. No. 10/899,809, filed Jul. 24, 2004.

* cited by examiner

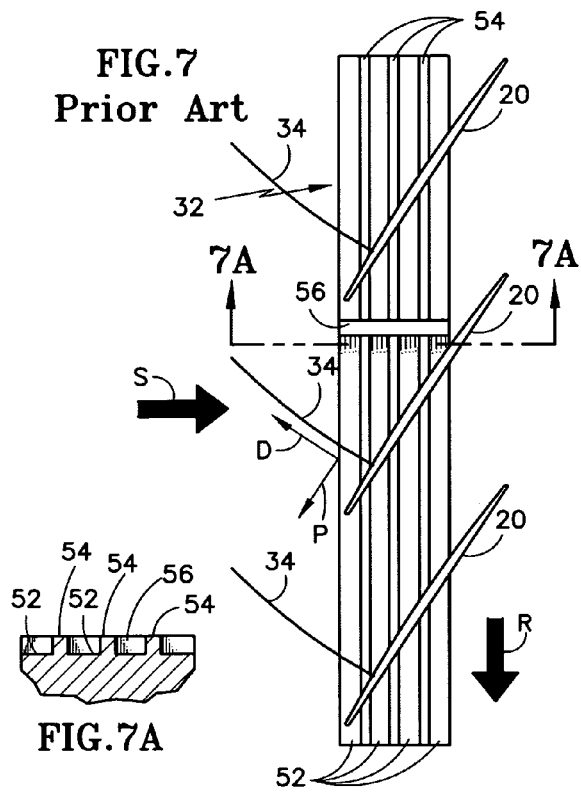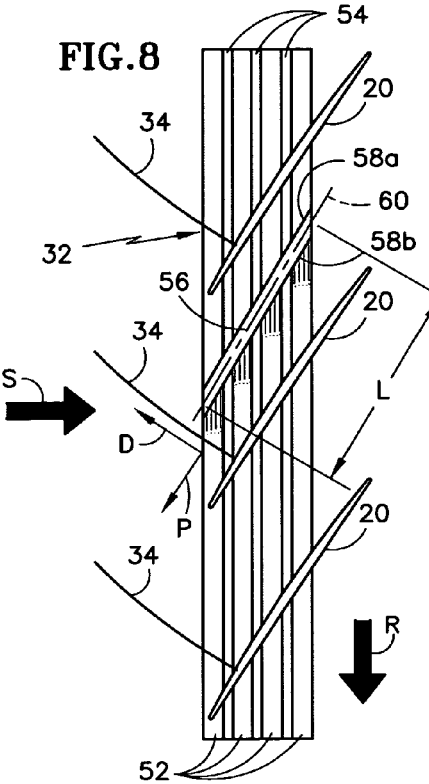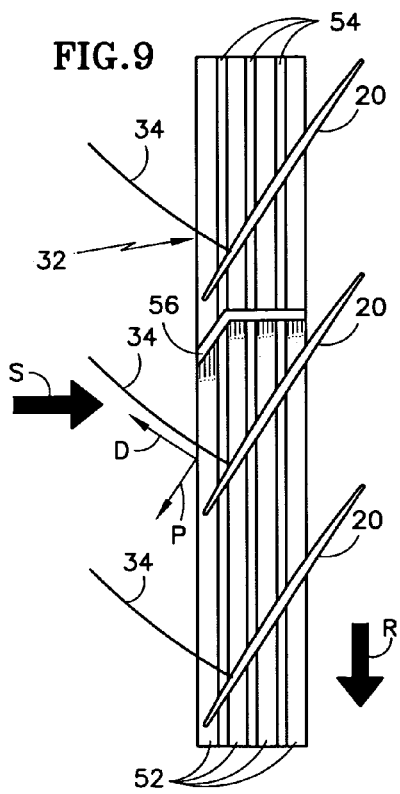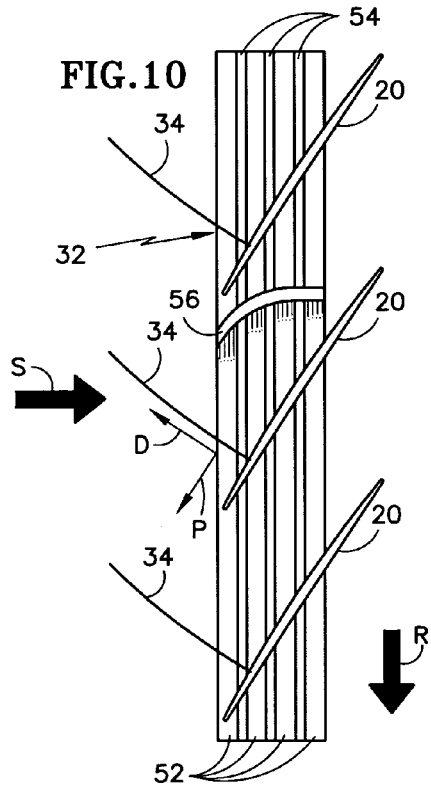

DUCT FOR REDUCING SHOCK RELATED NOISE

TECHNICAL FIELD

This invention relates to ducts having features that reduce noise associated with fluid dynamic shocks that propagate out of the duct.

BACKGROUND

Gas turbine engines, such as those used to power aircraft, include an array of fan blades positioned near the forward end of the engine. The blades project from a hub capable of rotation about an engine axis. A case circumscribes the tips of the blades to form a duct that defines the radially outer boundary of a working medium fluid flowpath. The duct internal wall often includes an acoustic liner residing axially forwardly of the blades for attenuating noise generated by the engine. The acoustic liner is usually made of several circumferentially extending segments whose edges are joined to each other by circumferentially distributed splices. The splices do not necessarily possess the noise attenuating properties present in the rest of the acoustic liner. Stated more technically, the acoustic impedance of the splices differs from the acoustic impedance of the rest of the acoustic liner.

During engine operation, the linear speed of each blade (sometimes referred to as wheel speed) increases with increasing radius. As a result, the radially outer portions of the blades can operate in a transonic or supersonic regime. The transonic regime is characterized by the formation, forward of the blades, of localized aerodynamic shocks that do not propagate upstream. The supersonic regime is characterized by shocks that propagate upstream. In both flow regimes the splices joining the acoustic liner segments can cause the acoustic energy of the shocks to be scattered into acoustic waves that may include modes whose pressure fluctuations are not necessarily radially close to the acoustic liner. Accordingly, the acoustic liner may be ineffective at attenuating these modes. The associated noise can propagate forwardly out of the duct.

In principle, the shock associated noise may be attenuated by using a single piece liner, or by using splices that possess noise attenuating properties similar to those of the acoustic liner. However these approaches are not always practical or cost effective.

Turbine engine ducts may also employ treatments, usually referred to as casing treatments, for enhancing the aerodynamic stability of the blades. One type of casing treatment includes circumferentially extending grooves in the case axially aligned with the blades. The grooves are axially separated from each other by intergroove rails. The grooves are interrupted by axially extending, circumferentially distributed partitions. The acoustic impedance of the partitions differs from the acoustic impedance of the grooves so that, like the acoustic splices described above, the partitions can cause shock related noise to propagate forwardly out of the duct. Since the partitions are desirable for aerodynamic reasons, they usually cannot be eliminated. Moreover, they cannot be made acoustically similar to the grooves.

Thus, it is seen that certain features in a duct, such as acoustic liners and casing treatment partitions, can cause shock related noise to propagate out of the duct. What is needed, therefore, is a way to include such features, without causing undesirable acoustic behavior.

SUMMARY

According to one embodiment of a duct disclosed herein, circumferentially distributed features capable of scattering acoustic energy associated with shocks are oriented, over at least a portion of their lengths, substantially perpendicular to the direction of shock orientation. In a more specific embodiment, the duct is intended to circumscribe a rotatable blade array, and the shocks are attributable to fluid flow past the blades.

The foregoing and other features of the various embodiments of the duct disclosed herein will become more apparent from the following description and the accompanying drawings.

BRIEF DESCRIPTION OF THE DRAWINGS

FIG. 7 is a view similar to FIG. 2 showing a stability enhancing, circumferentially grooved casing treatment with a conventional, axially oriented partition; FIG. 7A is a view in the direction 7A-7A of FIG. 7.

FIG. 8 is a view similar to FIG. 7 showing a stability enhancing, circumferentially grooved casing treatment with a linear partition oriented substantially perpendicular to a direction of shock orientation.

FIG. 9 is a view similar to FIG. 7 showing a casing treatment with a piecewise linear partition.

FIG. 10 is a view similar to FIG. 7 showing a casing treatment with a nonlinear partition.

DETAILED DESCRIPTION

Figure 1:
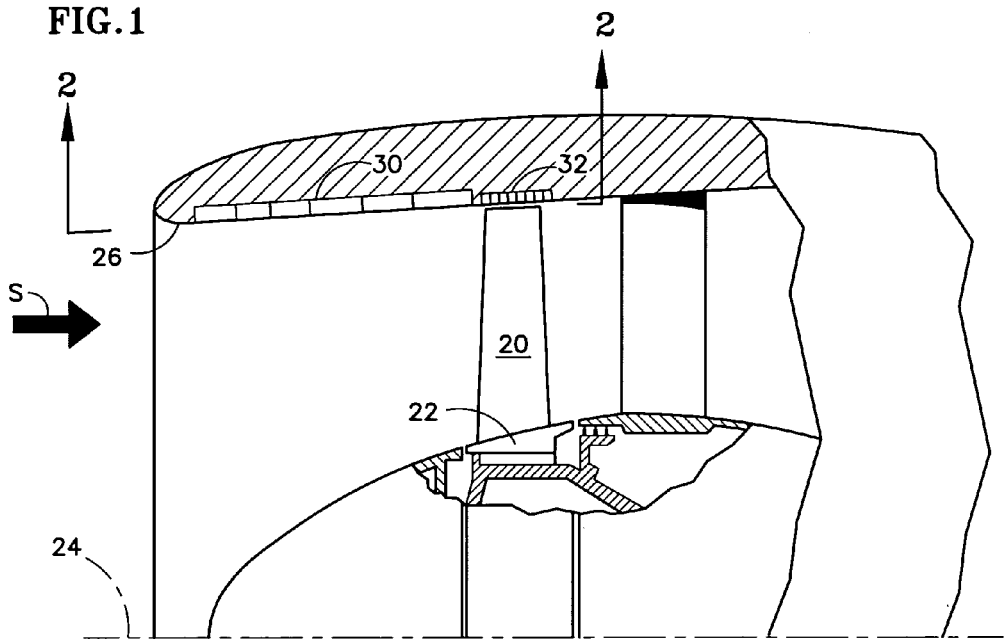
FIG. 1 is a schematic, cross sectional side elevation view of a turbine engine.

FIG. 1 shows an aircraft gas turbine engine that includes an array of fan blades 20 each projecting radially from a hub 22 that is rotatable about an engine axis 24. A case circumscribes the tips of the blades to form a duct 26 that defines the radially outer boundary of a flowpath. During engine operation, a stream of working medium fluid S flows through the duct and past the blades. The duct internal wall includes an acoustic liner 30 residing axially forwardly of the blades for attenuating noise generated by the engine. The duct also includes a casing treatment 32 axially aligned with the blades for enhancing the aerodynamic stability of the blades. Although FIG. 1 shows both an acoustic liner and a stability enhancing casing treatment, the acoustic liner and the casing treatment can be used independently of each other.

Figure 2:
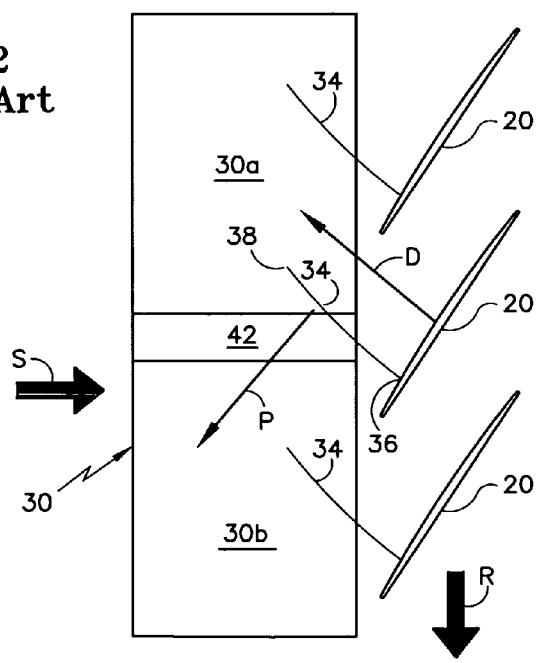
FIG. 2 is a view taken in the direction 2-2 of FIG. 1 showing an acoustic liner with a conventional, axially oriented splice.

FIG. 2 shows the blades 20 rotating in direction R and operating at a transonic condition. At the transonic condition, the Mach number of the fluid stream S is subsonic forward of the blades. However the Mach number of the fluid stream relative to an observer moving with the blades is supersonic along the suction surface of each blade. An aerodynamic shock 34 extends in a shock orientation direction D from the suction surface of each blade. The shock orientation direction is approximately the same from the shock origin 36 to its terminus 38. Because of the subsonic conditions forward of the blades, the shock is locally confined and decays a short distance forward of the blade array. Although the shock decays rather than propagates, the direction P, which is perpendicular to the shock orientation direction D, may be referred to as the direction of shock propagation.

FIG. 2 also shows that the acoustic liner 30 comprises two or more circumferentially extending segments 30a, 30b whose circumferentially adjacent edges are joined to each other by an axially extending splice 42. The splices do not necessarily possess the noise attenuating properties present in the rest of the acoustic liner, i.e. the acoustic impedance of the splices differs from the acoustic impedance of the rest of the acoustic liner. This mismatch in acoustic properties can scatter the energy of the decaying shocks into acoustic waves that propagate forwardly out of the duct even though the shocks themselves are locally confined.

Figure 3:
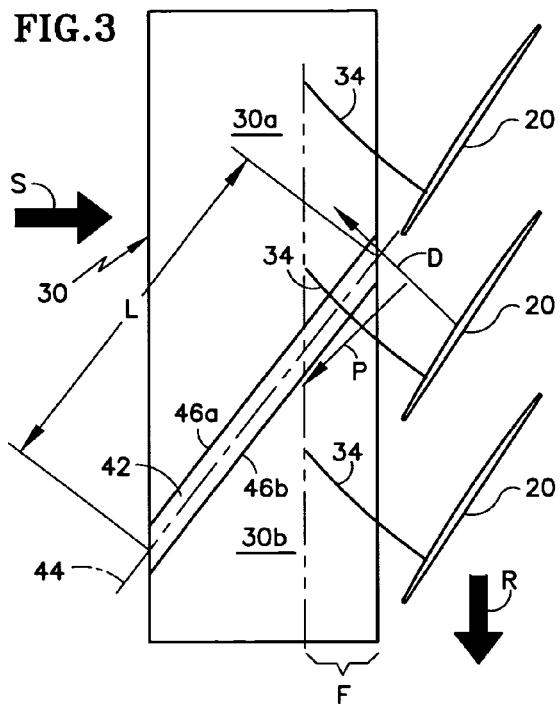
FIG. 3 is a view similar to FIG. 2 showing an acoustic liner with a linear splice oriented substantially perpendicular to a direction of shock orientation.

FIG. 3 illustrates a linear splice having a length L, a linear meanline 44 and a pair of edges 46a, 46b approximately equidistant from the meanline The splice is oriented substantially perpendicular to the shock orientation direction D. Specifically, the splice is oriented so that the edges 46a, 46b are substantially perpendicular to the shock orientation direction D. Because the edges 46a, 46b are equidistant from the meanline, the splice orientation can also be described as one in which the edges or the meanline are substantially parallel to the direction of propagation P. The orientation of the splice reduces the mismatch in acoustic impedance in the direction perpendicular to the shock orientation direction D (i.e. in the direction parallel to the direction of shock propagation P). In this particular example, the radially inner surfaces of the splice and the segments 30a, 30b are radially aligned.

FIG. 3 shows the splice oriented perpendicular to the shock orientation direction D over the entire length L of the splice. However because the shock 34 decays a short distance forward of the blades, only the portion of the splice in region F, i.e. the portion that axially coincides with the footprint of the shock, need be oriented as described. The footprint of the shock is the projection of the shock (or at least of that portion of the shock responsible for noise propagation out of the duct) onto the acoustic liner. The portion of the splice not axially coincident with the shock footprint may be oriented differently.

Figure 4A:
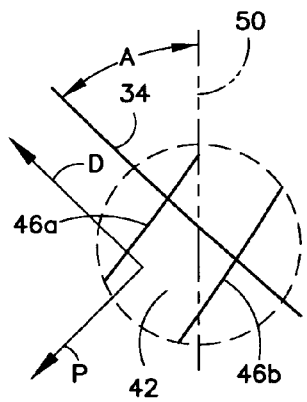
FIGS. 4A and 4B are magnified views of selected portions of the splice.
Figure 4:
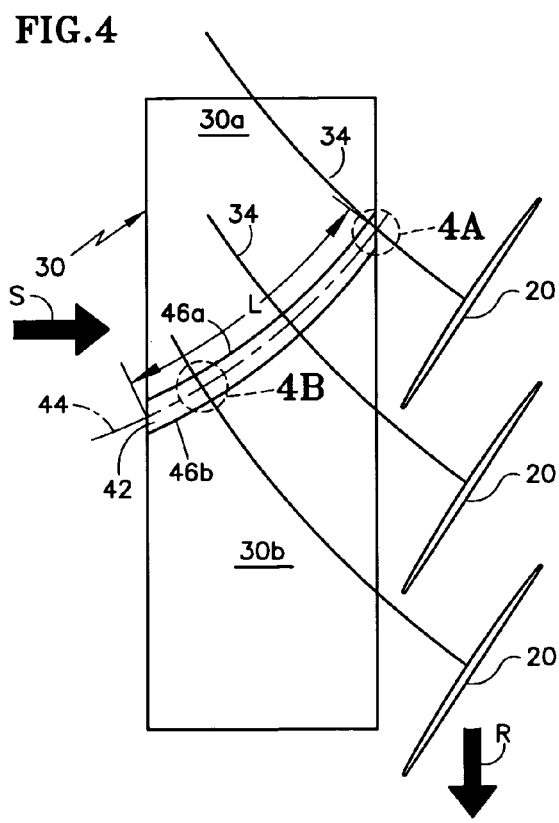
FIG. 4 is a view similar to FIG. 3 showing an acoustic liner with a nonlinear splice.
Figure 4B:
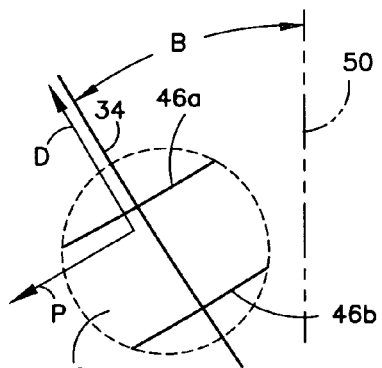

FIG. 4 is similar to FIG. 3 but shows the blades 20 operating at a supersonic condition. At the supersonic condition the Mach number of the fluid stream S is supersonic both forward of the blades and along the suction surface of each blade. An aerodynamic shock 34 extends in a shock orientation direction D from the suction surface of each blade. Because of the supersonic conditions forward of the blades, the shock 34 of FIG. 4, unlike the shock 34 of FIGS. 2 and 3, is not locally confined. Instead, the shock shown in FIG. 4 propagates a considerable distance forwardly out of the duct in shock propagation direction P. Because the shock of FIG. 4 is not locally confined, a considerable variation in the shock orientation direction D can be observed along the shock. The shock propagation direction P, which is locally perpendicular to the orientation direction D, likewise varies along the shock. These effects are evident in the magnified views of FIGS. 4A and 4B. Therefore, although the linear splice of FIG. 3 could be used to reduce shock associated noise, such a splice would have to be oriented at a compromise orientation and therefore would be acoustically suboptimal.

The splice of FIG. 4, like that of FIG. 3, is oriented, over at least some of its length L, substantially perpendicular to the shock orientation direction D. However because the shock orientation direction D changes along the shock, so does the local orientation of the splice. For example, near the aft end of the acoustic liner, the shock locally forms an angle A with a circumferentially extending reference line 50. However at a more forward location, the shock forms a more acute angle B. As a result, the splice edges 46a, 46b are oriented more axially in the vicinity of angle B than they are in the vicinity of angle A. In the limit, as seen in FIG. 4, the splice is curved so that its edges 46a, 46b are curved to be locally substantially perpendicular to the local shock orientation direction along the length of the splice. The meanline 44 is likewise curved. Although the illustration shows a splice whose edges are approximately equidistant from the meanline, a variable width splice with nonequidistant edges may also be used. The meanline would be curved even if the edges were nonequidistant.

Figure 5:
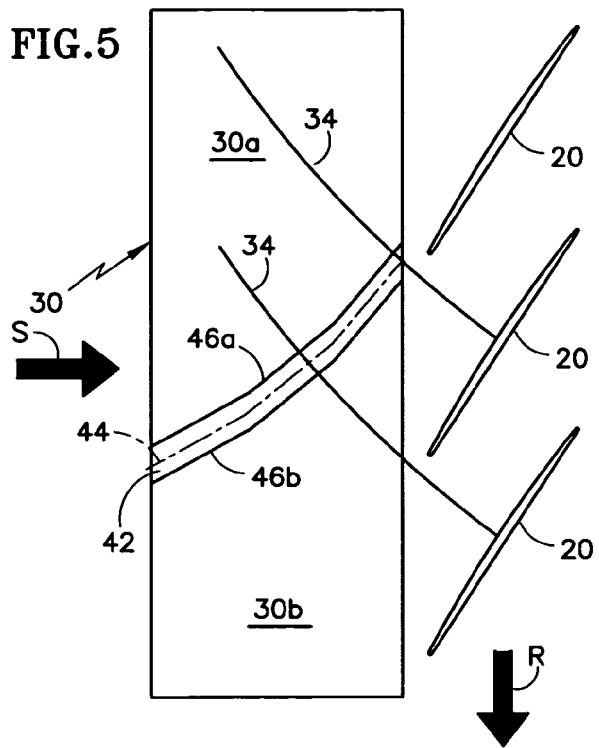
FIG. 5 is a view similar to FIG. 3 showing an acoustic liner with a piecewise linear splice.

As seen in FIG. 5, the above described curved splice may be approximated by a piecewise linear splice. As with the previously described variants, the edges 46a, 46b are locally approximately perpendicular to the local shock orientation direction.

In principle, the splices of FIGS. 4 and 5, like the splice of FIG. 3, need be oriented as described only where they coincide with the footprint of the shock. However because the shocks of FIGS. 4 and 5 are propagating shocks, rather than locally confined shocks, their footprint is expected to extend axially across the entire liner.

Figure 6:
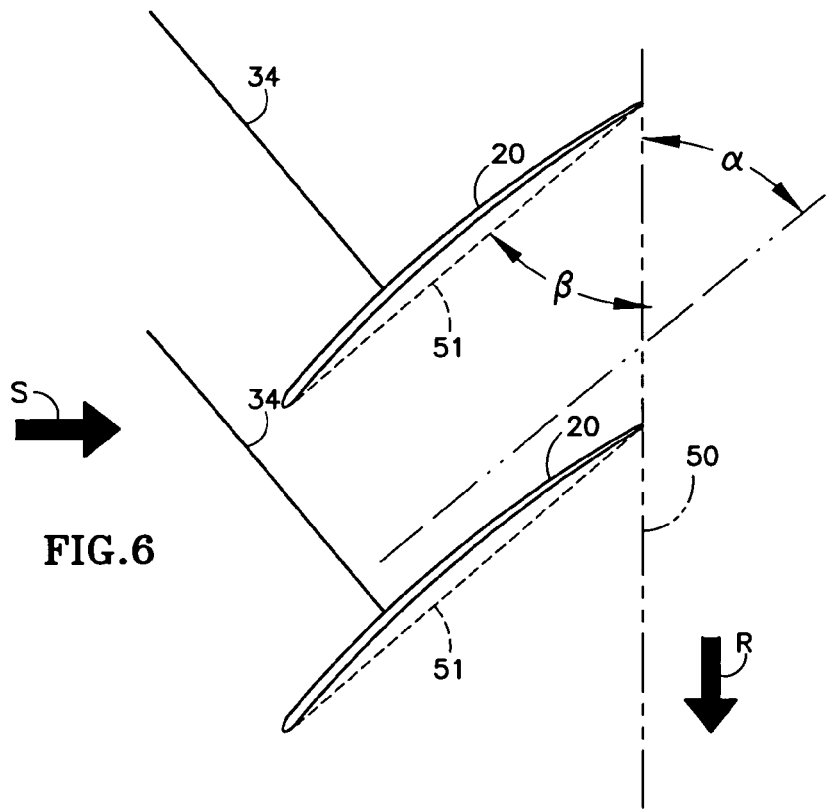
FIG. 6 is a view illustrating a relationship between blade stagger angle and the nominal orientation of an acoustic splice or other feature capable of scattering shock energy.

Referring now to FIG. 6, the orientation of the splice edges for the configurations of FIGS. 3-5 can be determined from the shock structure at the operating condition corresponding to the greatest noise. This condition almost always differs from the aerodynamic design point of the engine and can be referred to as the acoustic design condition. The acoustic design condition typically occurs at a blade relative Mach number of about 1.2, where the shock lies just forward of the blade leading edge and is almost normal, i.e perpendicular to the blade chord line 51, which is a line extending from the leading edge to the trailing edge. Therefore, as a rough guideline, the orientation angle $\alpha$ equals the blade stagger angle $\beta$ at the spanwise (i.e. radial) location corresponding to the peak shock strength, plus or minus about five degrees. Stagger angle is the angle between the blade chord line and circumferentially extending reference line 50. For a blade with a substantially radially oriented leading edge as seen in FIG. 1, the spanwise location of peak shock strength is usually at or near the blade tip. For a blade with a rearwardly or forwardly swept leading edge over part or all of its span, the effect of sweep and/or the effect of transitions from forward sweep to rearward sweep can cause the peak shock strength to occur radially inboard of the blade tip.

The foregoing discussion examines an acoustic liner splice as one example of a feature that is capable of detrimentally scattering acoustic energy and whose detrimental effect can be reduced by judiciously orienting the feature as described. However the foregoing principles including the determination of the orientation angle can be applied to other features as well.

Referring to FIGS. 7 and 7A, a second example relates to casing treatments that enhance the aerodynamic stability of the blades. FIGS. 7 and 7A show a casing treatment 32 comprising circumferentially extending grooves 52 residing in the case axially aligned with and radially outboard of the blades.

The grooves are axially separated from each other by intergroove rails 54. The grooves and rails are interrupted by axially extending, circumferentially distributed interruptions in the form of partitions such as representative partition 56. The acoustic impedance of the partitions differs from the acoustic impedance of the grooves so that, like the acoustic splices described above, the partitions can cause shock related noise to propagate forwardly out of the duct.

As seen in FIG. 8 the partitions are linear and have a length L. The partitions are oriented, over at least a portion of their length, substantially perpendicular to the direction of shock orientation D, which is substantially parallel to the direction of shock propagation P. Specifically, each partition is oriented so that its edges 56a, 56b are substantially perpendicular to the shock orientation direction D. Because the edges 56a, 56b are equidistant from partition meanline 60, the partition orientation can also be described as one in which the edges or the meanline are substantially parallel to the direction of propagation P. The orientation of the partition reduces the mismatch in acoustic impedance in the direction perpendicular to the shock orientation direction D (i.e. in the direction parallel to the direction of shock propagation P). The curved or piecewise linear concepts of FIGS. 4 and 5 respectively may be employed and may be attractive for shocks whose orientation direction D changes along the length of the shock.

Another variation arises from the fact that casing treatments are usually axially aligned with the blades, in contrast to acoustic liners which are usually axially forward of the blades. Because of this, the footprint of the shock, even a propagating shock, covers only a forward portion of the casing treatment. Accordingly, the partition may be a piecewise linear partition as seen in FIG. 9. The aft portion of the partition is not covered by the shock footprint and therefore is oriented axially. The forward portion of the partition is covered by the partition footprint and so is oriented so that its edges are perpendicular to the direction of shock orientation D, which is parallel to the direction of shock propagation P.

FIG. 10 shows a variant similar to that of FIG. 9 in which the partition 56 is curved rather than piecewise linear. As with the variant of FIG. 9, the aft portion of the partition is not covered by the shock footprint and therefore is oriented substantially axially. The forward portion of the partition is covered by the partition footprint and so is oriented so that its edges are approximately perpendicular to the direction of shock orientation D, which is parallel to the direction of shock propagation P.

Although FIGS. 4 and 10 both show curved features (acoustic liner splices and a casing treatment partition respectively) the curvature changes in different directions. In FIG. 4 the splice turns progressively more toward the axial direction with increasing distance away from the blades (in the forward direction) in order to accommodate the fact that the shock itself has a varying orientation direction D. By contrast, the partition of FIG. 10 turns more toward the circumferential direction with increasing distance away from the blades in order to accommodate the fact that the shock footprint covers only a forward portion of the casing treatment and undergoes little or no change in its direction of orientation along that forward portion of the casing treatment. Nevertheless, in both cases the intent is to locally orient the splice or partition to be substantially perpendicular to the local direction of shock orientation. Similar observations apply to the piecewise linear features of FIGS. 5. and 9.

The foregoing examples relate to devices in which the shocks 34 are attributable to fluid flow past blades 20. However the orientation of features as described herein is also applicable to shocks arising from other influences.

Although this invention has been shown and described with reference to specific embodiments thereof, it will be understood by those skilled in the art that various changes in form and detail may be made without departing from the invention as set forth in the accompanying claims.

We claim:

1. A duct including circumferentially distributed features capable of scattering acoustic energy associated with shocks extending in a shock orientation direction, each feature having a length and being oriented, over at least a portion of its length, substantially perpendicular to the shock orientation direction within a footprint of the shock.

2. The duct of claim 1 wherein the features include edges and the edges are substantially perpendicular to the shock direction.

3. The duct of claim 1 wherein the shocks have a direction of propagation, the features include a meanline and also include edges approximately equidistant from the meanline along the length of the features, and the meanlines are oriented, over at least a portion of their lengths, substantially parallel to the direction of propagation.

4. The duct of claim 1 wherein the features have a substantially linear meanline.

5. The duct of claim 1 wherein the features have a piecewise linear meanline.

6. The duct of claim 1 wherein the features have curved meanlines.

7. The duct of claim 1, wherein the features are longitudinally extending features.

8. The duct of claim 1 including an acoustic treatment and wherein the features are splices between segments of the acoustic treatment.

9. The duct of claim 1 including a stability enhancing duct treatment and wherein the features are circumferentially distributed interruptions in the treatment.

10. The duct of claim 9 wherein the stability enhancing duct treatment comprises at least one circumferentially extending groove.

11. The duct of claim 1 wherein the duct is intended to circumscribe a blade array rotatable about an axis, and the shocks are attributable to fluid flow past the blades.

12. The duct of claim 11 wherein the shocks have a peak shock strength occurring at a spanwise location along the blade at an acoustic design condition, the blades have a stagger angle determined at the same spanwise location, and the features are oriented at an angle approximately equal to the stagger angle plus or minus about five degrees.

13. The duct of claim 12 wherein the acoustic design condition occurs at a Mach number of about 1.2.

14. The duct of claim 11 wherein the blades are fan blades of a turbine engine.

15. The duct of claim 11 wherein the blades have leading edges extending substantially radially.

16. The duct of claim 11 wherein the blades have leading edges that extend in the direction of shock propagation past the features.

17. The duct of claim 11 wherein the blades have leading edges and a direction of rotation and the features have curved meanlines that are progressively more axially oriented with increasing distance away from the leading edges in an upstream direction.

18. The duct of claim 11 wherein the features extend past the blades in the direction of shock propagation.

19. The duct of claim 1, wherein the entire feature is oriented substantially perpendicular to the shock orientation direction.

20. The duct of claim 11, wherein the features are positioned upstream the blade array.

21. A duct including circumferentially distributed features capable of scattering acoustic energy associated with shocks extending in a shock orientation direction, each feature having a length and being oriented, over at least a portion of its length, substantially perpendicular to the shock orientation direction, wherein the duct is intended to circumscribe a blade array rotatable about an axis, and the shocks are attributable to fluid flow past the blades, wherein the features extend closer to an entrance of the duct than the blades.

22. The duct of claim 21 wherein the features have a rectangular cross-section.

23. A duct including a plurality of circumferentially distributed splices capable of scattering acoustic energy associated with shocks extending in a shock orientation direction, the splices having a length and being aligned with, over at least a portion of their lengths, a shock propagation direction.

24. The duct of claim 11, wherein the features are aligned with the blades.

25. A duct including circumferentially distributed features capable of scattering acoustic energy associated with shocks extending in a shock orientation direction, each feature having a length and being oriented, over at least a portion of its length within a footprint of the shock, transverse to the shock orientation direction.

26. The duct of claim 23, wherein the shock propagation direction is directed toward an inlet of the duct.

\* \* \* \* \*